No. 777,387.

Patented December 13, 1904.

UNITED STATES PATENT OFFICE.

JACOB C. McCLENAHAN, OF WILMINGTON, DELAWARE.

COMPOSITION FOR USE IN PRODUCING ARTIFICIAL STONE.

SPECIFICATION forming part of Letters Patent No. 777,387, dated December 13, 1904.

Application filed May 24, 1904. Serial No. 209,581. (No specimens.)

*To all whom it may concern:*

Be it known that I, JACOB C. McCLENAHAN, a citizen of the United States, residing at Wilmington, in the county of Newcastle and State of Delaware, have invented new and useful Improvements in Composition for Use in Producing Artificial Stone, of which the following is a specification.

This invention relates to compositions for use in producing artificial stone.

During an extended experience in the art of manufacturing artificial stone I have discovered that a more perfect and durable quality of stone is produced when the moisture is retained within the composition until complete induration or perfect crystallization has resulted.

The object of my invention, therefore, is to mold the stone composition in such manner as to retain the moisture therein for a sufficient period of time to effect complete and perfect crystallization. I attain this object preferably by the use of an improved composition which is used in constructing the mold, said composition consisting of suitable comminuted material—such, for example, as sand or pulverized stone—mixed thoroughly with a substance which is waterproof and enduringly plastic as well as proof against deterioration by time or atmospheric conditions. The substance which I prefer to use is petroleum-jelly.

In producing the molding composition of this invention the petroleum-jelly and sand are mixed thoroughly until a uniformly plastic and moisture-proof mass is produced.

In forming artificial stone the improved composition is tamped around the pattern in the usual manner and the pattern is withdrawn. The plasticity of the improved composition is sufficient to permit it to be readily tamped with the hand or a suitable implement and yet is not too great to prevent the mold produced therefrom retaining its shape after the withdrawal of the pattern. When the stone composition is poured into the mold thus produced, the petroleum-jelly prevents the escape of the moisture from said stone composition and perfect crystallization is induced.

I am aware that a composition consisting of sand and paraffin has been used heretofore in producing artificial stone. In practice it is found that the paraffin becomes hard as soon as it has been tamped around the pattern. For this reason in order to employ the molding composition more than once it is necessary to apply heat thereto in order to render it again plastic. This operation is rendered impractical by reason of the excessive quantities of material which are employed.

I am aware also that a composition consisting of moist sand and oleaginous vegetable press-cake has been employed in casting iron. The mold formed in this manner, however, is porous, and thus fails to prevent the escape of moisture from the stone composition, for which reason the perfect crystallization of the stone composition would be impossible. Furthermore, the vegetable press-cake soon spoils and prevents the reuse of the composition.

In manufacturing artificial stone economy is of the utmost importance, for which reason my improved composition, consisting of comminuted material mixed with a substance which is waterproof, enduringly plastic, and proof against deterioration by time or atmospheric conditions, constitutes an improvement over compositions which are not adapted to be reused a number of times and which are subject to deterioration.

Having thus described the invention, what is claimed as new is—

1. The herein-described composition for use in producing artificial stone, which consists of comminuted material mixed with an enduringly-plastic waterproof substance which is proof against deterioration by time or atmospheric conditions.

2. The herein-described composition for use in producing artificial stone, which consists of sand and petroleum-jelly.

In testimony whereof I affix my signature in presence of two witnesses.

JACOB C. McCLENAHAN.

Witnesses:
 CHAS. S. HYER,
 GEORGE M. BOND.